(12) United States Patent
Greenhill et al.

(10) Patent No.: US 8,305,438 B2
(45) Date of Patent: Nov. 6, 2012

(54) TESTING SURVEILLANCE CAMERA INSTALLATIONS

(75) Inventors: Stewart Ellis Smith Greenhill, Hilton (AU); Seng C. Tan, Canning Vale (AU); Geoffrey Alec William West, Kalamunda (AU); Svetha Venkatesh, Winthrop (AU)

(73) Assignee: Curtin University of Technology (AU)

( * ) Notice: Subject to any disclaimer, the term of this patent is extended or adjusted under 35 U.S.C. 154(b) by 576 days.

(21) Appl. No.: 12/295,053

(22) PCT Filed: Mar. 28, 2007

(86) PCT No.: PCT/AU2007/000398
§ 371 (c)(1),
(2), (4) Date: Jan. 30, 2009

(87) PCT Pub. No.: WO2007/109856
PCT Pub. Date: Oct. 4, 2007

(65) Prior Publication Data
US 2009/0303324 A1   Dec. 10, 2009

(30) Foreign Application Priority Data

Mar. 29, 2006   (AU) ................................. 2006901599

(51) Int. Cl.
*H04N 5/232*   (2006.01)
(52) U.S. Cl. ......... 348/143; 348/180; 348/175; 348/187
(58) Field of Classification Search .................. 348/143
See application file for complete search history.

(56) References Cited

U.S. PATENT DOCUMENTS

| | | | |
|---|---|---|---|
| 5,778,008 A | 7/1998 | Shimizu et al. | |
| 2005/0280709 A1* | 12/2005 | Katayama | 348/187 |
| 2006/0029272 A1* | 2/2006 | Ogawa | 382/154 |
| 2006/0036383 A1* | 2/2006 | Clare et al. | 702/85 |
| 2006/0153472 A1* | 7/2006 | Sakata et al. | 382/255 |
| 2008/0158359 A1 | 7/2008 | Takeda | |

FOREIGN PATENT DOCUMENTS

| | | |
|---|---|---|
| JP | 2003162724 A | 6/2003 |
| JP | 2006-352644 | 12/2006 |
| WO | 95/24702 A1 | 9/1995 |

\* cited by examiner

*Primary Examiner* — Hua Fan
(74) *Attorney, Agent, or Firm* — Brooks Kushman P.C.

(57) ABSTRACT

This invention concerns the testing of surveillance camera installations. In particular, the invention involves an automatic testing system for surveillance camera installations, and a method for testing. The invention involves receiving test or "probe" images from at least one camera in the installations. Storing a reference image from at least the one camera. Comparison of the probe image with a reference image from the same camera, and production of an output when maintenance is required for that camera. The comparison involves the steps of: Extracting salient features from both the probe and reference images. Calculating matching factors between the salient features extracted from both images. And, computing a decision about whether maintenance is required from the matching factors.

7 Claims, 12 Drawing Sheets

TESTING SURVEILLANCE CAMERA INSTALLATIONS

TECHNICAL FIELD

This invention concerns the testing of surveillance camera installations. In particular, the invention involves an automatic testing system for surveillance camera installations, and a method for testing.

BACKGROUND ART

In large scale deployments of surveillance cameras, one of the key costs arises out of the continual need to inspect the cameras to identify those requiring maintenance. Also, one of the key operational requirements is to rapidly and efficiently repair defective cameras. Typically, the cameras are inspected for damage, viewing offset, or vandalism at regular intervals by personnel assigned this responsibility. Alternatively, some procedure may be provided to enable personnel having duties that might lead them to notice a defective camera, to report a camera apparently in need of maintenance.

DISCLOSURE OF THE INVENTION

The invention is an automatic testing system for surveillance camera installations, comprising:
An input port to receive test or "probe" images from at least one camera in the installation.
A computer memory to store a reference image from at least the one camera.
A computer processor to compare a probe image with a reference image from the same camera and produce an output when maintenance is required for that camera; the comparison involving the steps of:
Extracting salient features from both the probe and reference images.
Calculating matching factors between the salient features extracted from both images.
Computing a decision about whether maintenance is required from the matching factors.

Sensitivity parameters in the decision computation may be user selectable to provide maintenance appropriate to the users business needs.

The system may operate continuously in real time, or may be activated to test a camera at regular intervals, such as at midnight each day.

The system may be resilient to lighting fluctuations, the occurrence and movement of shadows and non-image artefacts, such as pen marks on the camera lens.

The system is able to report the following camera problems: loss of video signal, shift of the camera position away from the original location, partial or full occlusion by external structures, graffiti markings on the lens, and out-of-focus image.

The system for camera checking can reside either at the camera itself or at a remote server where many cameras are able to be tested. A DSP-type implementation of the invention can be considered for the camera option.

In another aspect the invention concerns a method for testing surveillance camera installations, comprising the steps of:
Receiving test or "probe" images from at least one camera in the installation.
Storing a reference image from at least the one camera.
Comparing a probe image with a reference image from the same camera and producing an output when maintenance is required for that camera; the comparison involving the steps of:
Extracting salient features from both the probe and reference images.
Calculating matching factors between the salient features extracted from both images.
Computing a decision about whether maintenance is required from the matching factors. In further aspects the invention concerns software or a digital signal processor (DSP) implementation for testing surveillance camera installations by performing the method defined above.

BRIEF DESCRIPTION OF THE DRAWINGS

The invention will now be described with reference to the accompanying drawings, in which.

BEST MODES OF THE INVENTION

Figure 1:
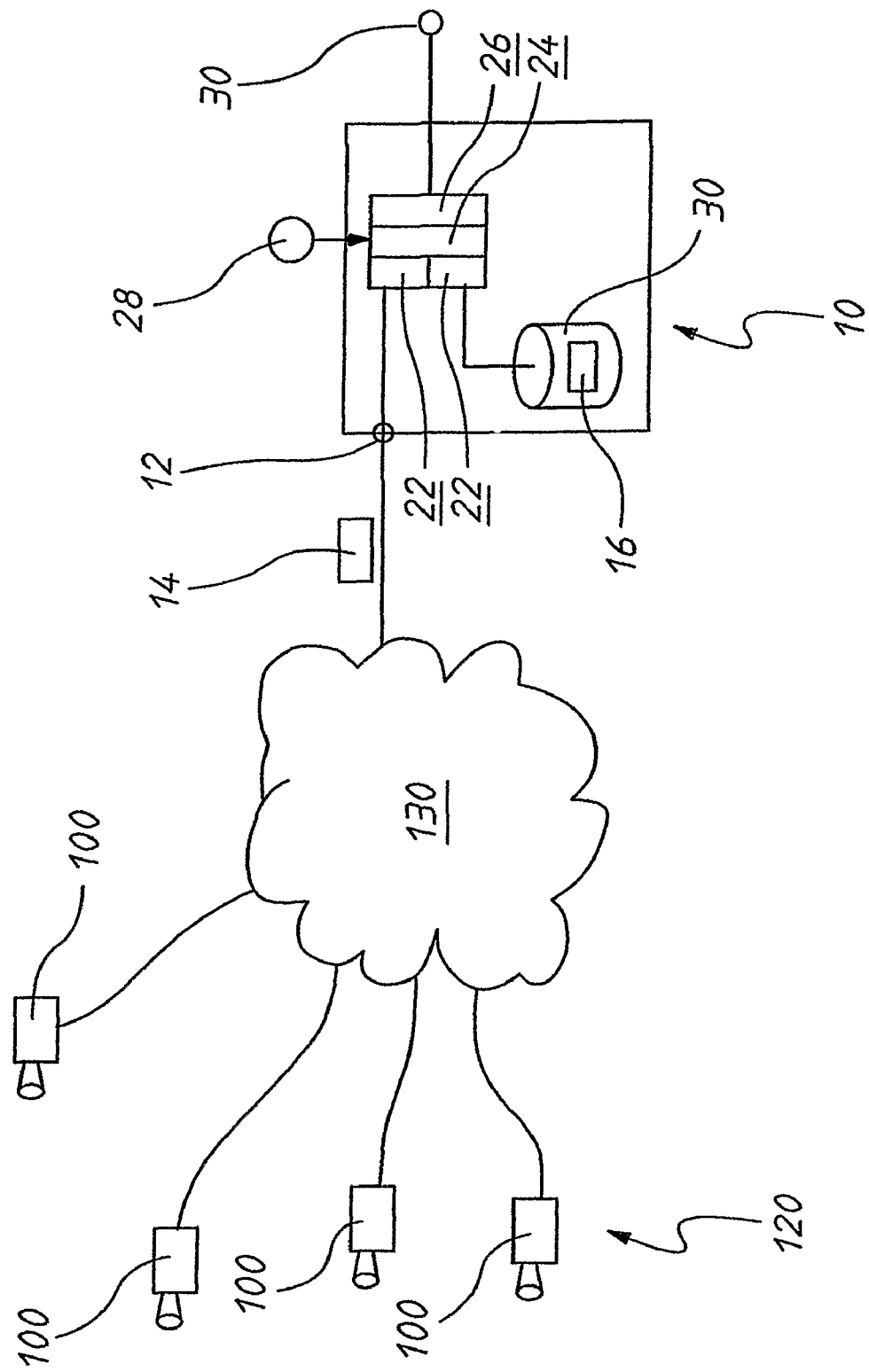
FIG. 1 is a block diagram of an automatic test system.

Referring first to FIG. 1, the automatic testing system 10 for surveillance camera installations has an input port 12 to receive test or "probe" images 14 from cameras 100 in the installation 120. The system 10 also stores reference images 16 for each camera 100 for comparison with respective probe images 14. The comparison is performed by a computer and takes place in a number of processing steps (illustrated more clearly in FIG. 2), including Salient Feature Extraction 22, Image Matching 24, and then a Decision Computation 26 where sensitivity is user selectable 28. Finally an output 30 is available indicating that a particular camera 100 is in need of maintenance.

The camera installation 120 may be large, for instance there could be several hundred surveillance cameras 100 in a public building such as an airport, or even more in transport applications such as fleets of aeroplanes, ships, buses, trains and taxis.

The cameras 100 in the installation 120 may apply the test internally and transmit the result back to base. Alternatively, the cameras 100 may transmit probe images or video 14. In either case the images are in electronic form and are provided to the system 10 in real time via telecommunications 130. Alternatively again, digital images could be periodically provided or recorded on physically transported media, such as tape or disc, for later testing. If the probe images 14 are not sourced in digital form they may be digitized at any suitable point, for instance by scanning.

The automatic testing system 10 includes computer memory 30 to store reference images 16 in digital form. These images may be generated at the time each camera 100 is installed, and the images 16 may be updated on each occasion camera is serviced.

Figure 2:
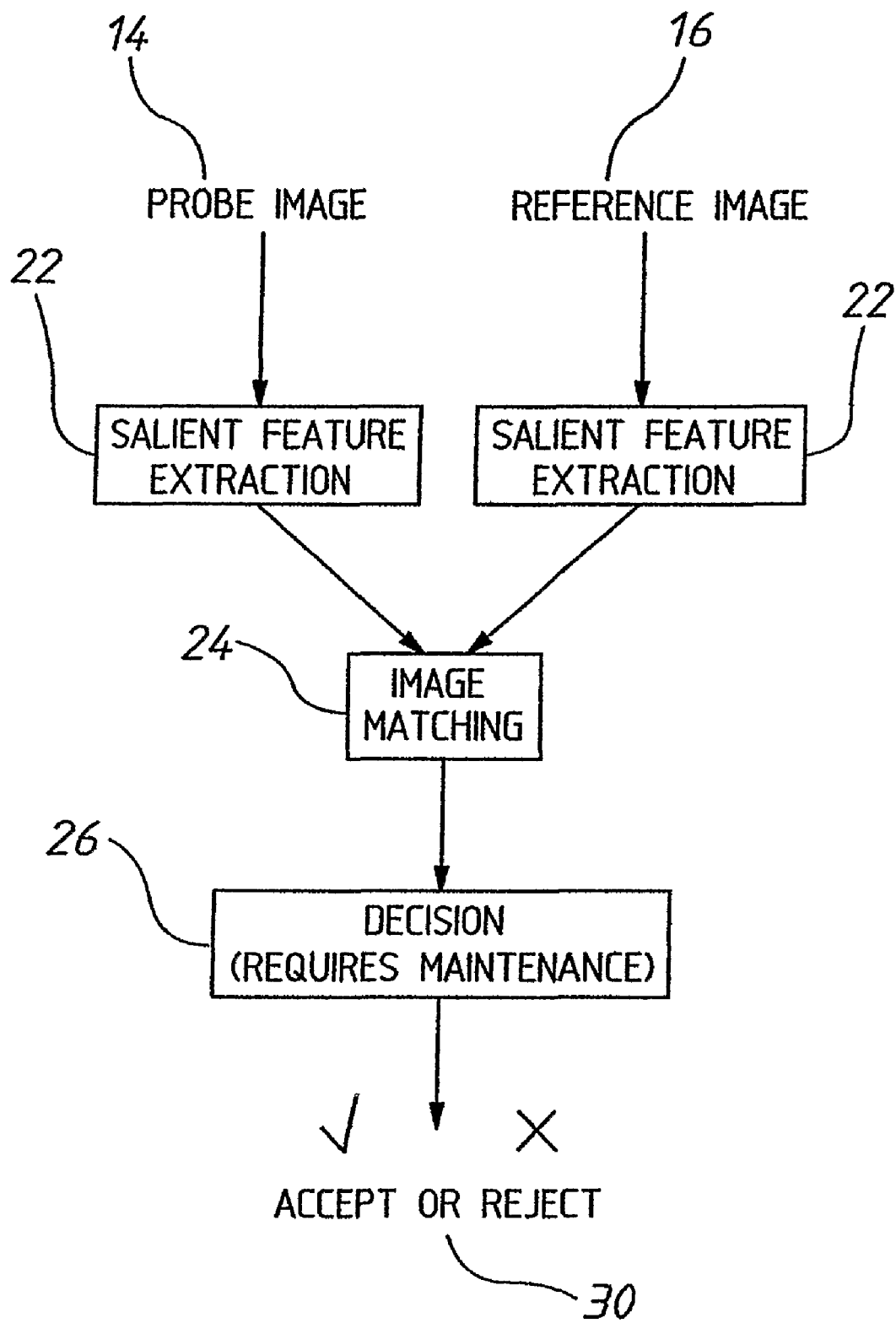
FIG. 2 is a flowchart of the computer processing within the system of FIG. 1.

In any event the system 10 is set up so that each camera is tested at preselected intervals by comparing the probe image 14 with the current reference image 16. The testing takes place in a staged process involving Salient Feature Extraction 22, Image Matching 24, and a Decision 26, as shown in FIG. 2. These stages will now be described in greater detail:

Salient Feature Extraction 22

This involves the extraction of important information-bearing details of the probe and reference images. The features selected must not be greatly affected by natural lighting variations and shadow movements in the camera's field of view. For instance the images recorded from a camera mounted in bus or train will experience natural changes in lighting depending on the weather, the time of day and the location, and these variations must not trigger a request for maintenance. Examples of suitable salient features include edges, corners, texture and colors. The salient features may be selected for the field of view of each camera, so that parts of the image are selected for further processing. Alternatively, an algorithm may be built to automatically extract these features by image processing, such an algorithm may operate over a period of time to identify the natural changes. In any event, since the reference images are regularly updated, the salient features are extracted from both probe and reference images at the time of testing, and the processed images are then forwarded to the Image Matching module 24.

It some cases, pre-processing of these reference images to extract the salient features may be performed in advance before storage in a database. By separating out this process during matching, the overall computational time can be further reduced.

Image Matching 24

The primary task of the Image Matching module 24 is to estimate the deviation between the probe 14 and the reference 16 images. Any approaches at matching a pair of images and determining the deviation between them may be suitable. One effective means is to calculate the cross-correlation measure between the image pair. This can either be achieved in the spatial domain or more efficiently in the frequency domain using fast fourier transforms. The current image matching module calculates and reports the following factors:

A Normalised Matching Factor (NMS) having values ranging between 0.0 and 1.0 representing the degree of match between the probe and reference image. 0.0 reflects a very poor matching outcome whereas 1.0 represents a perfect match.

A Shift Factor ($x_{shift}$, $y_{shift}$) which reflects the amount of spatial deviation in 2-dimension needed to align the probe image with that of the reference image. The unit of measure is a single pixel. A (0, 0) shift factor means that the probe image is in perfect alignment with the reference image.

A Defocus Factor (DF) which represents the amount of blurring of the probe image as compared to the reference image. DF values range between 0 and 4, with 0 indicating no blurring in the probe image and 4 indicating maximum blurring.

A Normalised Matching Factor (NMS), the Shift Factor, and the Defocus Factor (DF) are subsequently reported to the Decision Computation Module 26.

Decision Computation 26

The three image matching Factors from Image Matching module 24 are used to assist the Decision Computation module 26 to determine whether the probe image compares well with the reference image. A classifier can be used to decide if the probe image is accepted or rejected. For instance a rule-based decision method may be adopted as the classifier. If the image is rejected, that means the camera requires maintenance. An instance of a rule-based classifier is illustrated in FIG. 3.

Figure 3:
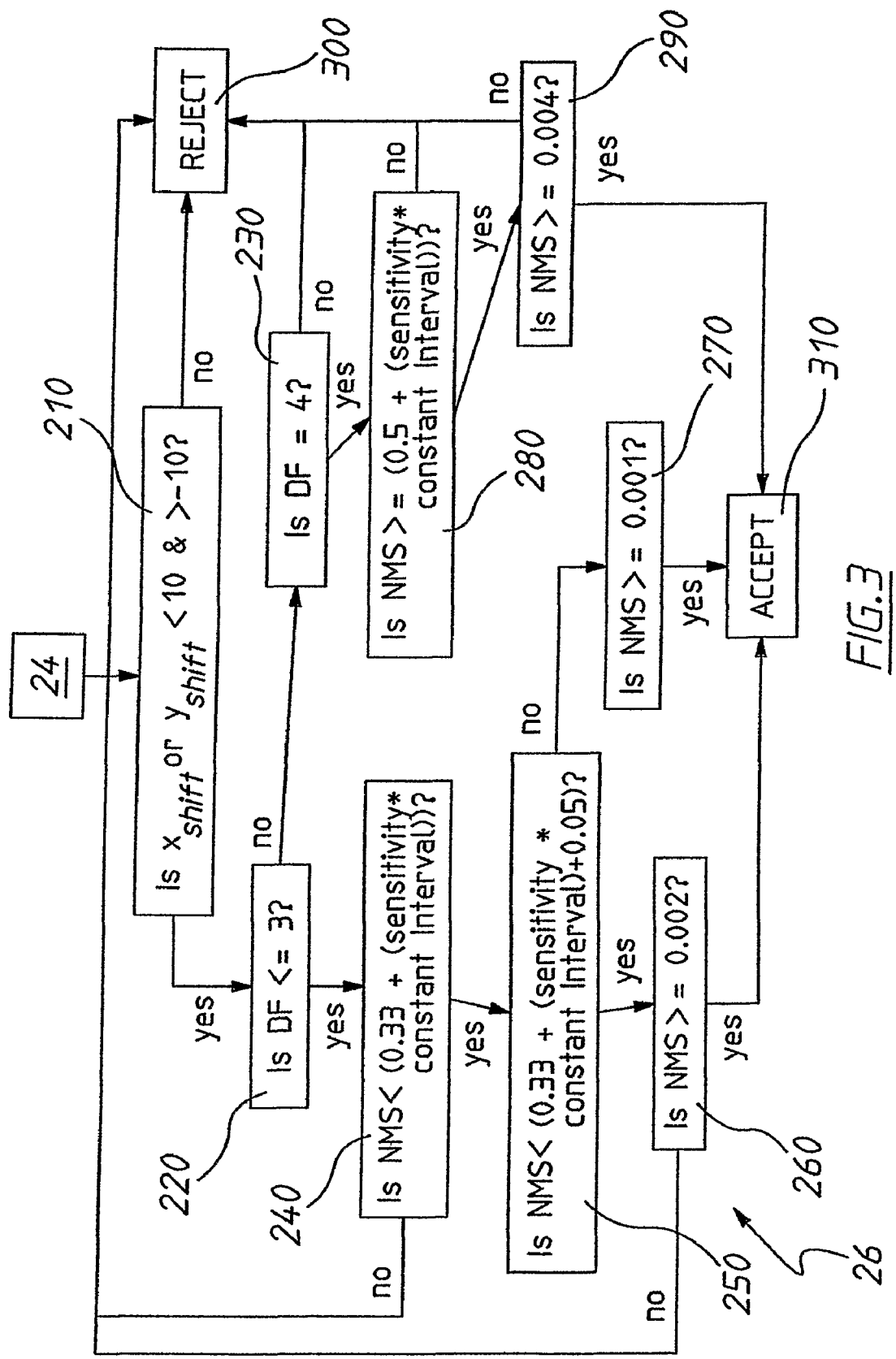
FIG. 3 is a flow chart of a rule-based decision method for determining image quality.
Figure 4A:
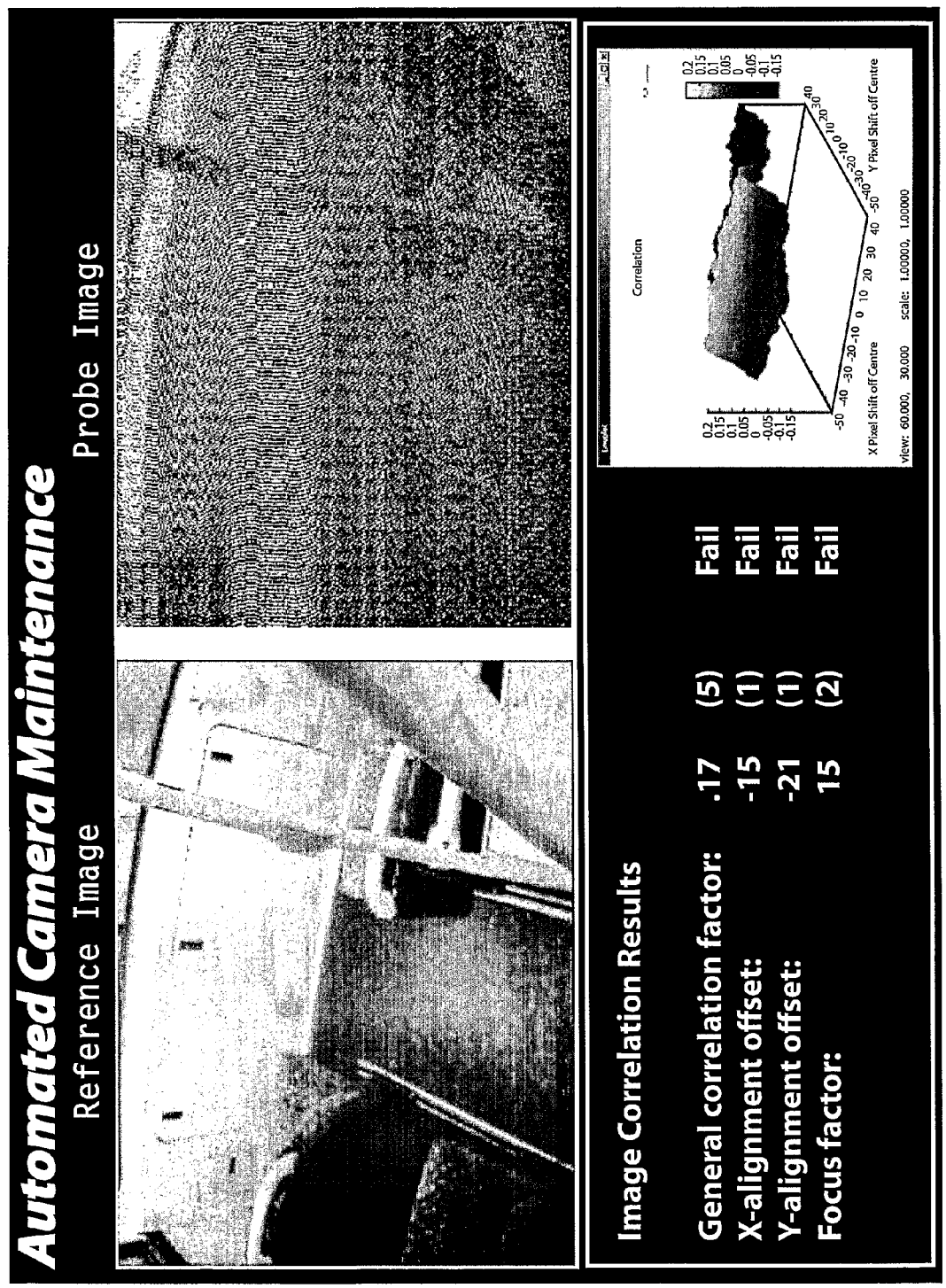
FIG. 4 (*a*) to (*i*) are a series of screenshots from a system testing the invention.
Figure 4B:
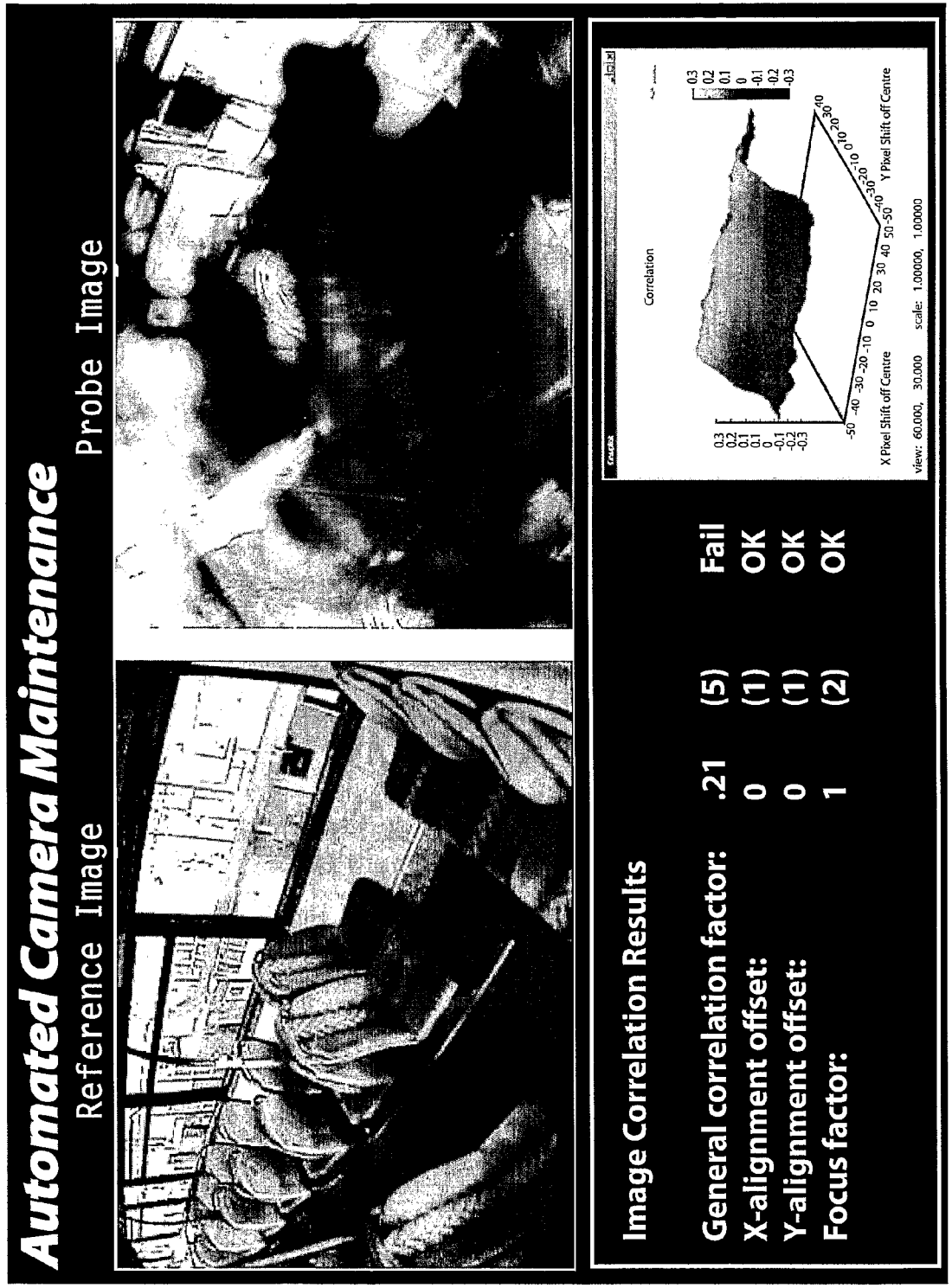
Figure 4C:
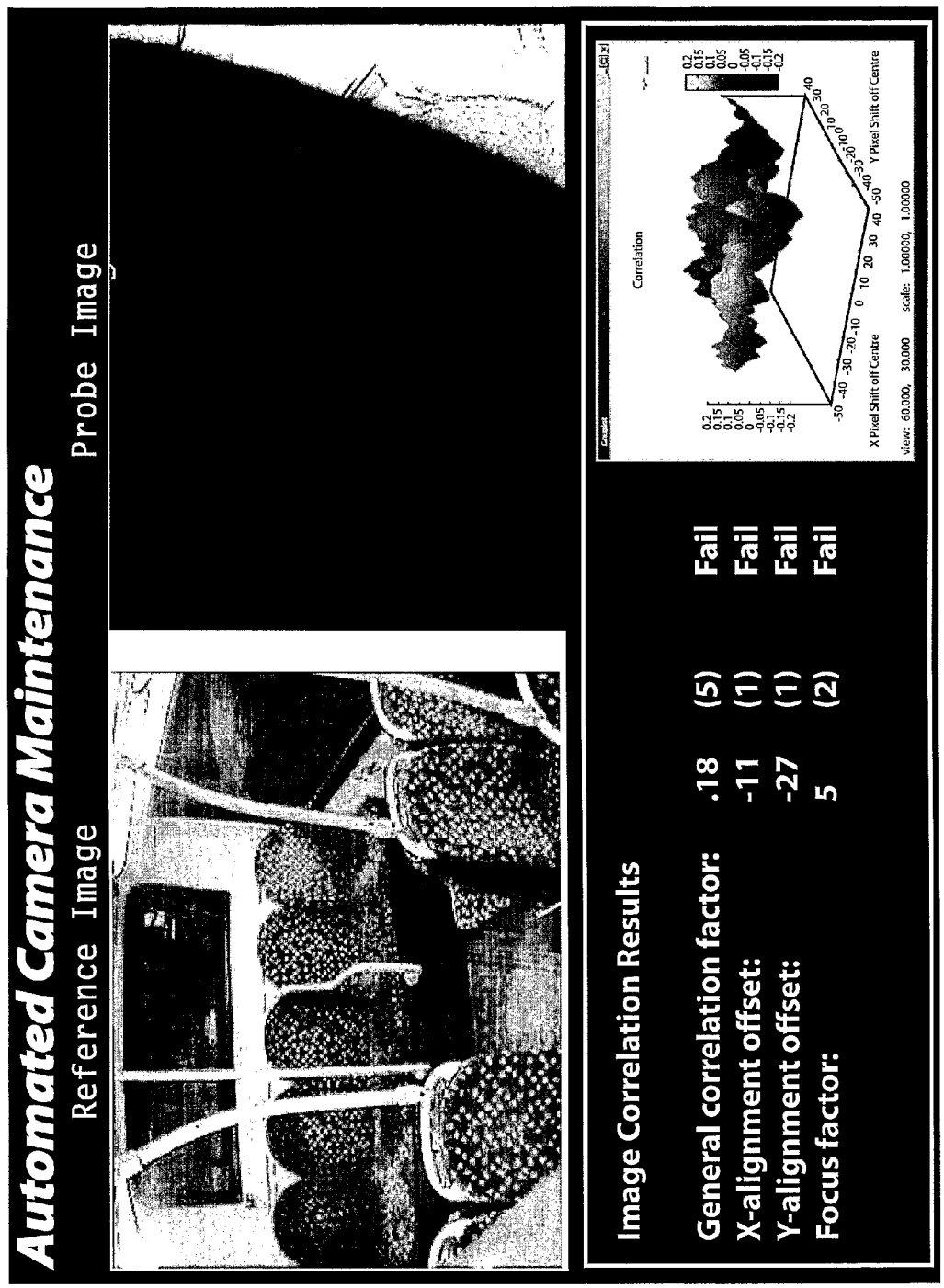
Figure 4D:
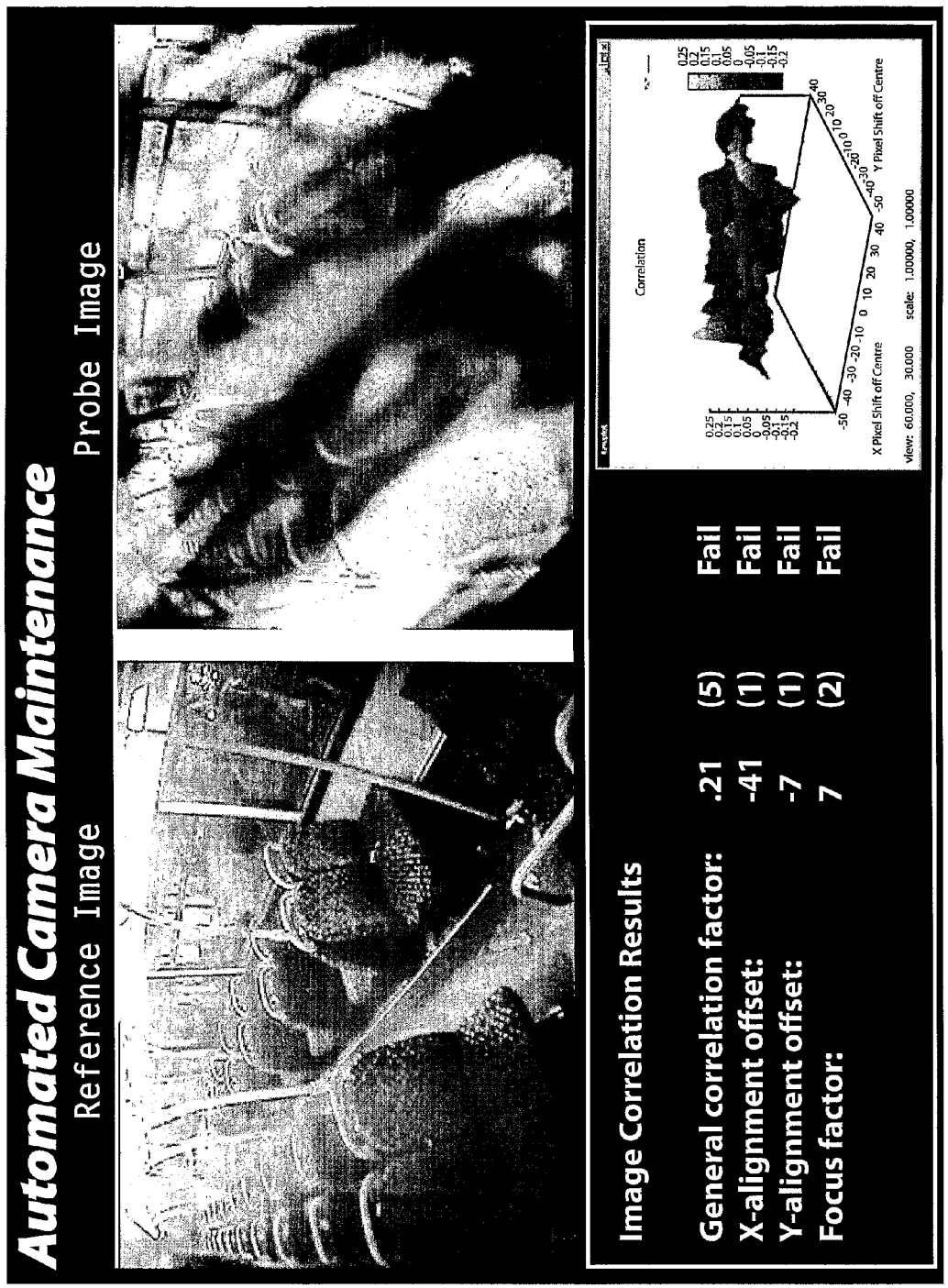
Figure 4E:
Figure 4F:
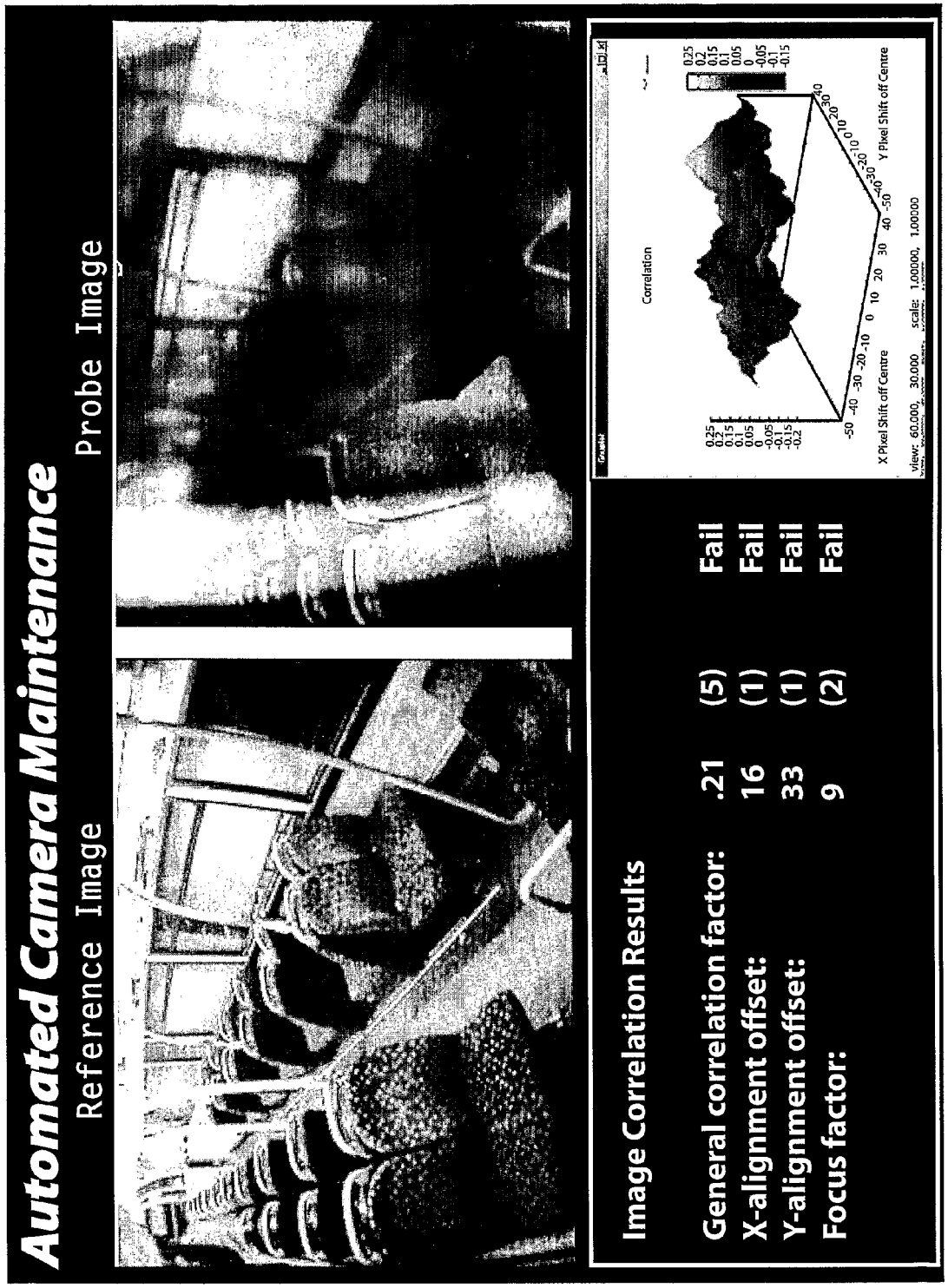
Figure 4G:
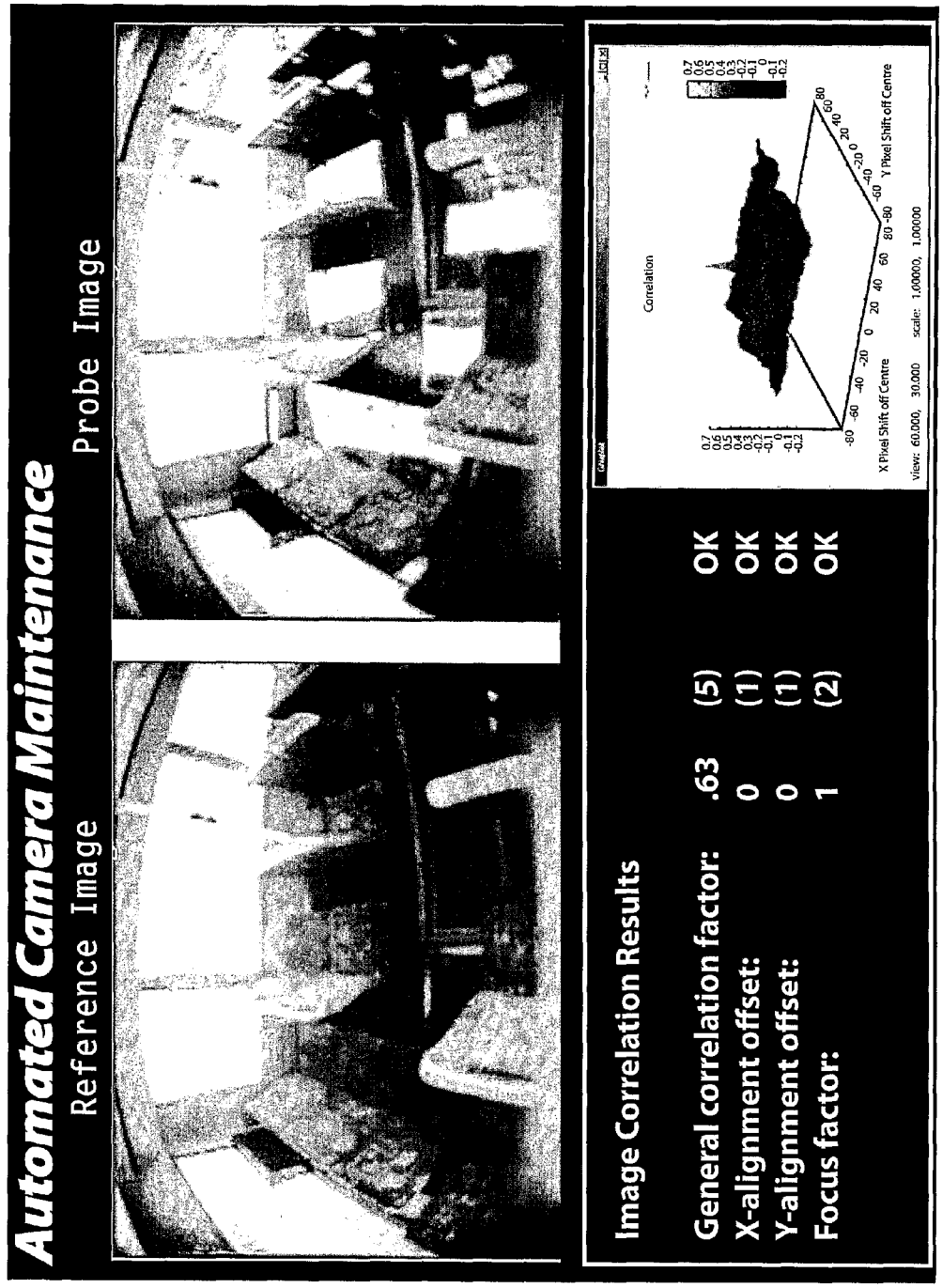
Figure 4H:
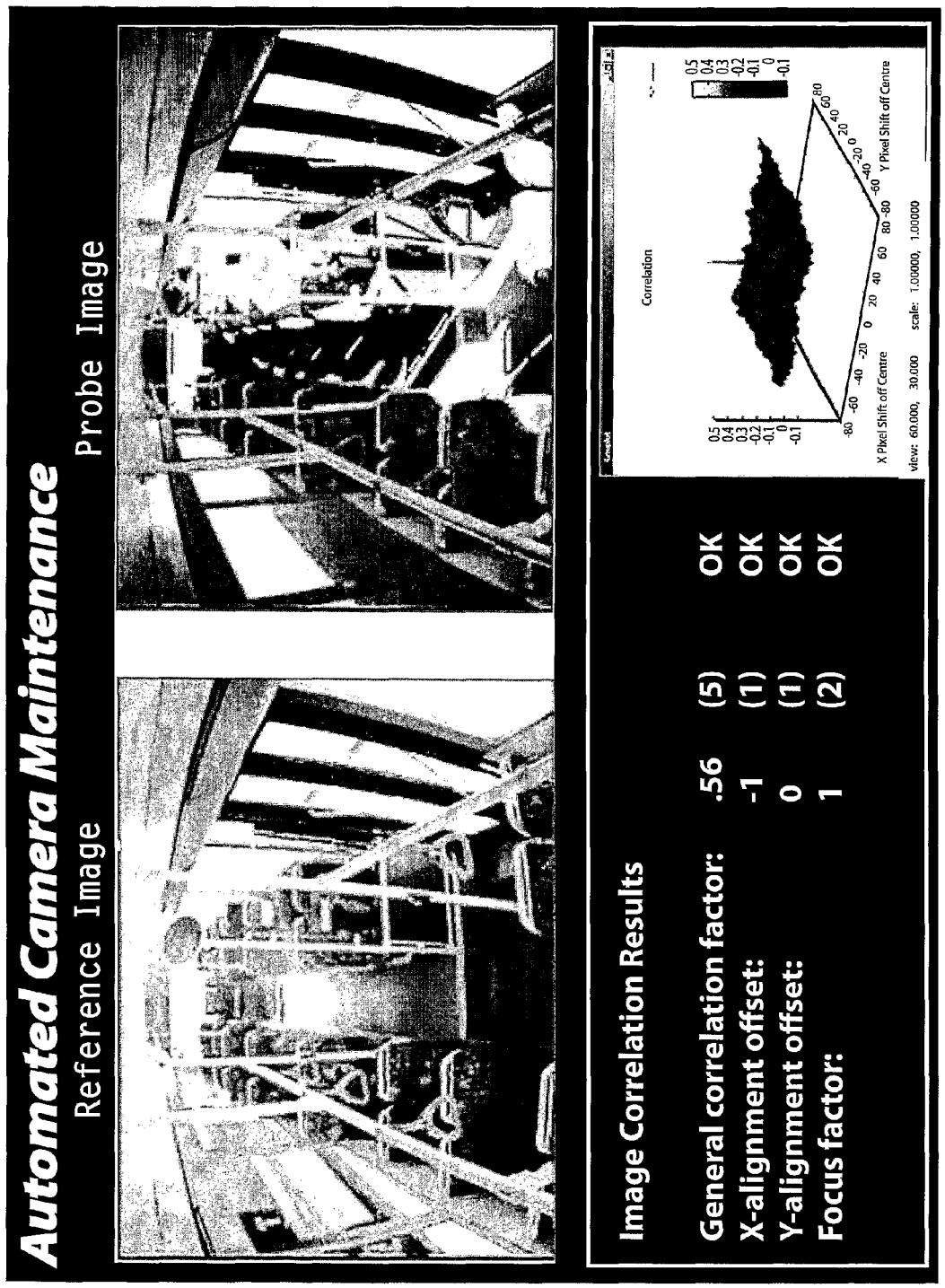
Figure 4I:
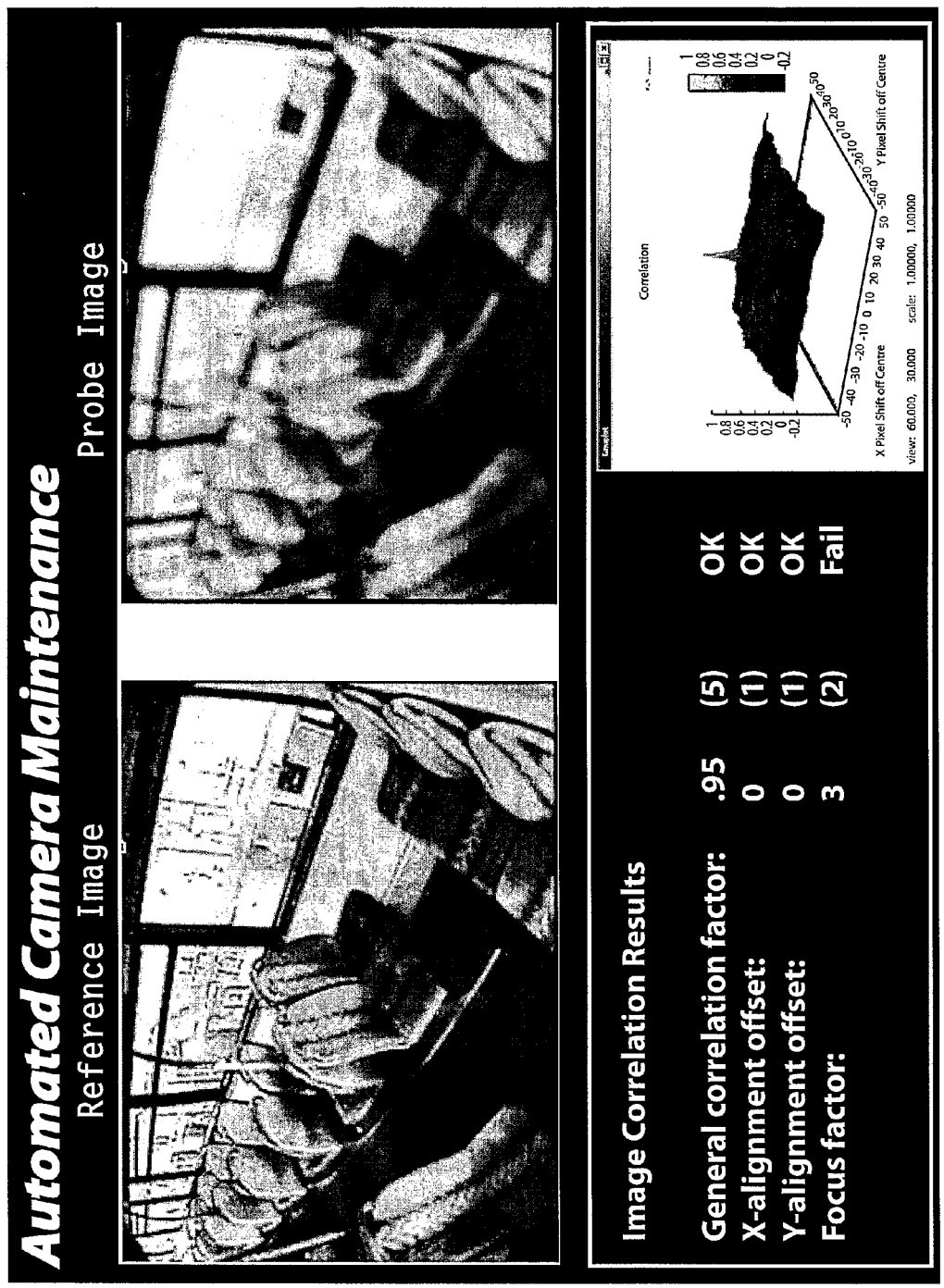

In FIG. 3 the image matching Factors from Image Matching module 24 are provided to the decision structure. The Factors are first tested 210 to see whether the Shift Factor has a modulus of less than 10, if not the test result is output as "REJECT" 300 meaning that maintenance is required.

Next the data is tested 220 to see if the Defocus Factor (DF) is less than or equal to 3. A further test 230 determines whether the DF is greater than 3 but less than 4, and if so the result is output as "REJECT". If the DF is less than or equal to 3 then the Normalised Matching Factor (NMS) is tested 240 to see if it is less than:

(0.33+(sensitivity*constant Interval))

and if not the test result is output as "REJECT". If so the NMS is further tested to see if it is less than:

(0.33+(sensitivity*constantInterval)+0.05)

If so the NMS is further tested at 260 to determine whether NMS>=0.002; if it is greater than this value the test result is output as "ACCEPT" 310 and if not "REJECT". On the other hand if the NMS is not less than:

(0.33+(sensitivity*constantInterval)+0.05)

then it is further tested at 270 to determine whether the NMS is <=0.001 and if so the test result is output as "ACCEPT".

If at 220 and 230 the DF is found to be between 3 and 4, then the NMS is tested at 280 to determine whether it is greater than or equal to:

(0.5+(sensitivity*constantInterval))

and if so it is further tested 290 to determine whether NMS is <=0.004. If so the test result is output as "ACCEPT" otherwise it is "REJECT".

The sensitivity and constantInterval parameters both set the sensitivity level of the decision. These values for sensitivity are 0 to 10 inclusive. The value for the constantInterval is 0.017. sensitivity is user specified.

Where the test result is output as "REJECT" then maintenance is required.

FIGS. 4(a) to (i) illustrate test data, and each shows the probe and reference images together with the corresponding correlation graphs, image matching scores and the decision results produced using the invention.

Although the invention has been described with reference to particular examples it should be appreciated that many variations and modification are available within the scope of the invention, as will be readily evident to the appropriately skilled person. For instance, many other salient features may be extracted instead of, or in addition to, those described. Similarly, many other measures may be used for image matching instead of, or in addition to, those described. Again, many other decision making schemes may be used instead of, or in addition to, those described.

The invention claimed is:

1. An automatic testing system for surveillance camera installations, comprising:

an input port to receive "probe" images from at least one camera in the installation;

a computer memory to store a reference image from at least the one camera;

a computer processor to compare a probe image with a reference image from the same camera and produce a decision about whether maintenance is required for that camera; the comparison involving the steps of:

extracting salient features from both the probe and reference images to produce a processed probe image and a processed reference image;

calculating a normalized matching factor, a shift factor and a defocus factor based on the processed probe image and processed reference image, wherein:

the normalized matching factor represents the degree of match between the processed probe image and processed reference images, the shift factor reflects the amount of spatial deviation in 2-dimension needed to align the processed probe image with the processed reference image, and the defocus factor represents the amount of blurring of the processed probe image as compared to the processed reference image; and determining whether the normalized matching factor, shift factor and defocus factor satisfy one or more rules to compute the decision about whether maintenance is required for that camera.

2. A system according to claim 1, wherein at least one rule is associated with whether the normalized matching factor, shift factor or defocus factor satisfies a threshold that depends on a user selectable sensitivity parameter.

3. A non-transitory medium storing computer software for performing a method for testing surveillance camera installations, the method comprising the steps of:

receiving "probe" images from at least one camera in the installation;

storing a reference image from at least the one camera;

comparing a probe image with a reference image from the same camera and producing a decision about whether maintenance is required for that camera; the comparison involving the steps of:

extracting salient features from both the probe and reference images to produce processed probe image and a processed reference images;

calculating a normalized matching factor, a shift factor and a defocus factor based on the processed probe and reference images, wherein:

the normalized matching factor represents the degree of match between the probe and reference images, the shift factor reflects the amount of spatial deviation in 2-dimension needed to align the probe image with the reference image, the defocus factor represents the amount of blurring of the probe image as compared to the reference image; and determining whether the normalized matching factor, shift factor and defocus factor satisfy one or more rules to compute the decision about whether maintenance is required for that camera.

4. The medium of claim 3, wherein the extracting step, for the reference image, is performed in advance and the results stored for later use.

5. The medium of claim 3 wherein the computer software performs the method continuously in real-time.

6. The medium of claim 3 wherein the computer software performs the method at regular intervals.

7. The medium of claim 3, wherein at least one rule is associated with whether the normalized matching factor, shift factor or defocus factor satisfies a threshold that depends on a user selectable sensitivity parameter.

* * * * *